H. A. WAHLERT AND J. E. REDFORD.
AUTOMATIC SLACK ADJUSTER.
APPLICATION FILED JUNE 30, 1920.
1,422,499.
Patented July 11, 1922.
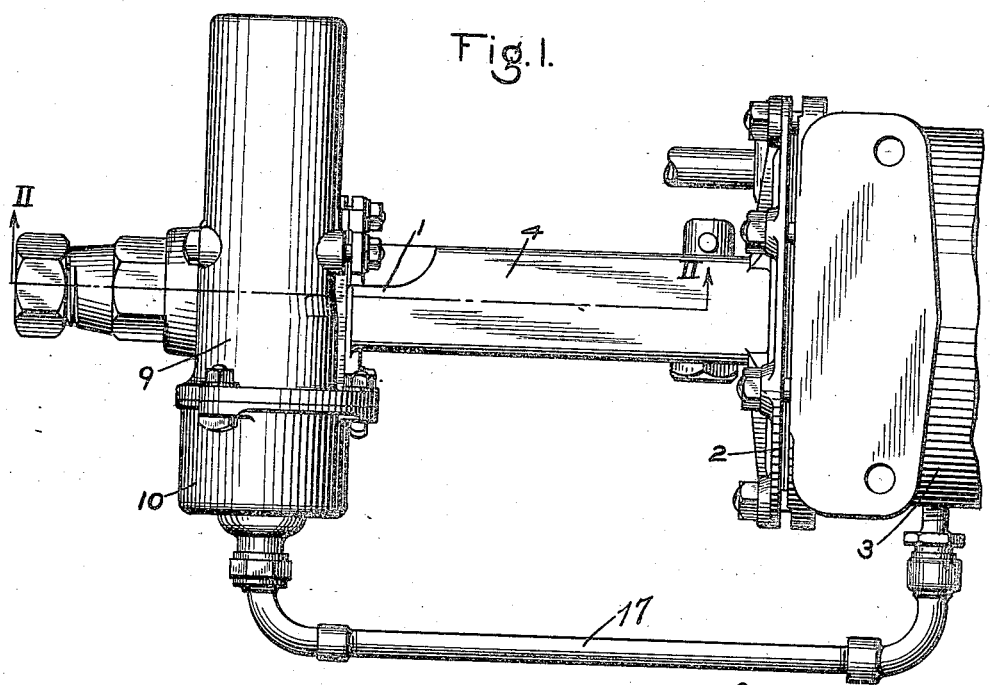
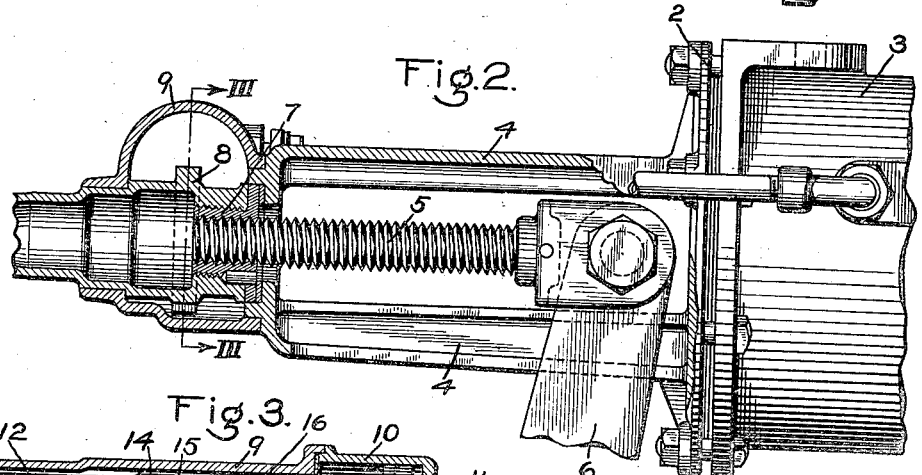
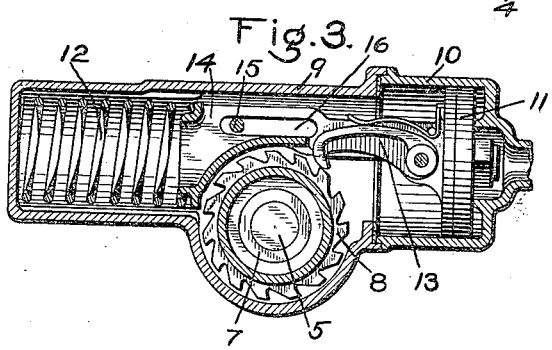
INVENTORS
HENRY. A. WAHLERT
JOHN E. REDFORD
BY *Wm. A. Cady*
ATTORNEY

UNITED STATES PATENT OFFICE.

HENRY A. WAHLERT, OF ST. LOUIS, AND JOHN E. REDFORD, OF KINLOCH PARK, MISSOURI, ASSIGNORS TO THE AMERICAN BRAKE COMPANY, OF ST. LOUIS, MISSOURI, A CORPORATION OF MISSOURI.

AUTOMATIC SLACK ADJUSTER.

1,422,499. Specification of Letters Patent. Patented July 11, 1922.

Application filed June 30, 1920. Serial No. 392,949.

*To all whom it may concern:*

Be it known that we, HENRY A. WAHLERT and JOHN E. REDFORD, both citizens of the United States, and residents, respectively, of the city of St. Louis and the State of Missouri, and Kinloch Park, in the county of St. Louis and State of Missouri, have jointly invented a certain new and useful Improvement in Automatic Slack Adjusters, of which the following is a specification.

This invention relates to an automatic slack adjuster for taking up slack due to the wear of the brake shoes on the car wheels.

One object of our invention is to save space by casting the slack adjuster body integral with the brake cylinder head.

Another object of our invention contemplates disposing the release spring of the slack adjuster and the fluid pressure cylinder for taking up slack on opposite sides of the ratchet wheel, in order to secure a better distribution of weight and increased compactness.

Another object of the invention is to provide an improved guiding means for the slack adjusting piston.

In the accompanying drawing; Fig. 1 is a plan view of a slack adjuster applied to a brake cylinder and embodying our invention; Fig. 2 a section on the line II—II of Fig. 1; and Fig. 3 a section on the line III—III of Fig. 2.

As shown in the drawing, the slack adjuster body 1 is cast integral with the brake cylinder head 2 of brake cylinder 3. Between the side members 4 of the body 1 is mounted a slack adjuster screw 5, having one end pivotally connected to the usual brake lever 6, and the other end threaded into a nut 7 carried by a ratchet wheel 8.

Arranged transversely of the members 4 is a casing 9 having a cylinder 10, at one side of the ratchet wheel, containing a piston 11, and a chamber at the opposite side containing a release coil spring 12.

Pivotally connected to the piston 11 is a pawl 13 adapted to engage the teeth of the ratchet wheel 8 and secured to said piston is a guide stem 14 which extends over the ratchet wheel and provides an abutment for the spring 12.

The piston 11 and the pawl 13 are guided and maintained in their proper operating positions by means of a bolt 15, secured in the casing 9 and extending through an elongated slot 16 formed in the piston stem 14.

Upon applying the brakes, if the movement of the brake cylinder piston exceeds the normal amount, the piston will uncover a port in the brake cylinder 3, so that fluid under pressure will be supplied through a pipe 17 to the slack adjuster cylinder 10 and the piston 11 will be operated so as to shift the pawl 13 to engage a tooth of the ratchet wheel 8.

When the brakes are released, the fluid pressure is released from cylinder 10, and the spring 12 operates to retract the piston 11 and pawl 13, so that the pawl actuates the ratchet wheel 8 to turn the nut 7 and thus draw up the screw 5, thereby taking up the slack.

Having now described our invention, what we claim as new and desire to secure by Letters Patent, is:

1. In a brake slack adjuster, the combination with a casing, a ratchet wheel centrally disposed within the casing, and means operated by said wheel for taking up the slack, of a piston mounted in the casing on one side of said wheel, a pawl actuated by said piston for engaging the ratchet wheel, a spring mounted in the casing at the opposite side of the wheel, and a member connected to said piston and extending to the opposite side of the wheel for transmitting the pressure of the spring to the piston.

2. In a brake slack adjuster, the combination with a ratchet wheel and pawl and means operated thereby for taking up the slack, of a piston subject on one side to fluid under pressure for operating said pawl, a spring opposing the fluid pressure on the piston, a slotted member connected to said piston and a guide pin engaging the slot in said member.

3. In a brake slack adjuster, the combination with a casing, a ratchet wheel mounted in said casing, and a pawl for operating the ratchet wheel, of a piston subject on one side to fluid under pressure and operatively connected to said pawl, a spring for opposing the fluid pressure on said piston, a member carried by said piston and provided with an elongated guide slot, and a guide pin secured to said casing and engaging in said slot.

In testimony whereof we have hereunto set our hands.

HENRY A. WAHLERT.
JOHN E. REDFORD.